(12) United States Patent
Gicklhorn et al.

(10) Patent No.: US 9,316,717 B2
(45) Date of Patent: Apr. 19, 2016

(54) POSITION DETERMINATION OF DEVICES USING STEREO AUDIO

(75) Inventors: Daniel P. Gicklhorn, Irvine, CA (US); Dang Van Tran, Laguna Niguel, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 879 days.

(21) Appl. No.: 13/183,241

(22) Filed: Jul. 14, 2011

(65) Prior Publication Data
US 2012/0127831 A1 May 24, 2012

Related U.S. Application Data

(60) Provisional application No. 61/416,971, filed on Nov. 24, 2010.

(51) Int. Cl.
 G01S 3/808 (2006.01)
 G01S 11/14 (2006.01)
 G01S 5/18 (2006.01)

(52) U.S. Cl.
 CPC ............... G01S 3/8083 (2013.01); G01S 5/18 (2013.01); G01S 11/14 (2013.01)

(58) Field of Classification Search
 CPC .......... G01S 5/30; G01S 3/8083; G01S 11/14
 USPC ........................................ 367/118, 127, 129
 See application file for complete search history.

(56) References Cited

U.S. PATENT DOCUMENTS

| | | | | |
|---|---|---|---|---|
| 4,422,076 A | * | 12/1983 | Tricoles et al. | 342/458 |
| 5,070,484 A | * | 12/1991 | Mantel | 367/124 |
| 6,078,669 A | | 6/2000 | Maher | |
| 6,118,205 A | * | 9/2000 | Wood et al. | 310/316.01 |
| 6,272,072 B1 | * | 8/2001 | Wulich et al. | 367/124 |
| 7,307,537 B2 | * | 12/2007 | Brungot et al. | 340/573.3 |
| 7,342,350 B2 | * | 3/2008 | Toda | 310/334 |
| 8,791,701 B2 | * | 7/2014 | Branson et al. | 324/326 |
| 8,864,686 B2 | * | 10/2014 | Roche et al. | 600/587 |
| 2003/0014243 A1 | | 1/2003 | Lapicque | |
| 2005/0232081 A1 | * | 10/2005 | Holm | 367/118 |
| 2006/0221769 A1 | * | 10/2006 | Van Loenen et al. | 367/99 |
| 2007/0133352 A1 | * | 6/2007 | Kim et al. | 367/128 |

(Continued)

FOREIGN PATENT DOCUMENTS

WO WO 9955057 A2 * 10/1999

*Primary Examiner* — Luke Ratcliffe
*Assistant Examiner* — Hovhannes Baghdasaryan
(74) *Attorney, Agent, or Firm* — Sherman IP LLP; Kenneth L. Sherman; Steven Laut

(57) ABSTRACT

Methods and systems for determining and utilizing spatial correlative information relating to two or more devices to determine device positioning are described. Using audio signals emitted from stereo speakers, for example, associated with a first device and a microphone associated with the second device, the distance and angle between the two devices and as their relative positions can be determined. No other sensors or specialized accessories are needed on either device to calculate the distance and angles. The devices need only be loaded with the appropriate software which, when executed, is able to carry out steps of the present invention. The usefulness of one or both of the devices may be enhanced by knowing the distance and angle data between the devices. For example, one device may be a TV having stereo speakers and the other device may be a handheld device, such as a smartphone, having a microphone.

33 Claims, 7 Drawing Sheets

(56) References Cited

U.S. PATENT DOCUMENTS

2007/0159924 A1* 7/2007 Vook et al. .................... 367/127
2007/0189551 A1   8/2007 Kimijima
2007/0211026 A1* 9/2007 Ohta ............................. 345/158
2008/0084789 A1* 4/2008 Altman ......................... 367/127
2009/0086577 A1* 4/2009 Ledeczi et al. ................ 367/129
2009/0310444 A1* 12/2009 Hiroe ............................ 367/125
2009/0316529 A1* 12/2009 Huuskonen et al. .......... 367/124
2010/0142327 A1* 6/2010 Kepesi et al. ................. 367/124
2010/0286949 A1* 11/2010 Miyamoto et al. ............ 702/150

* cited by examiner

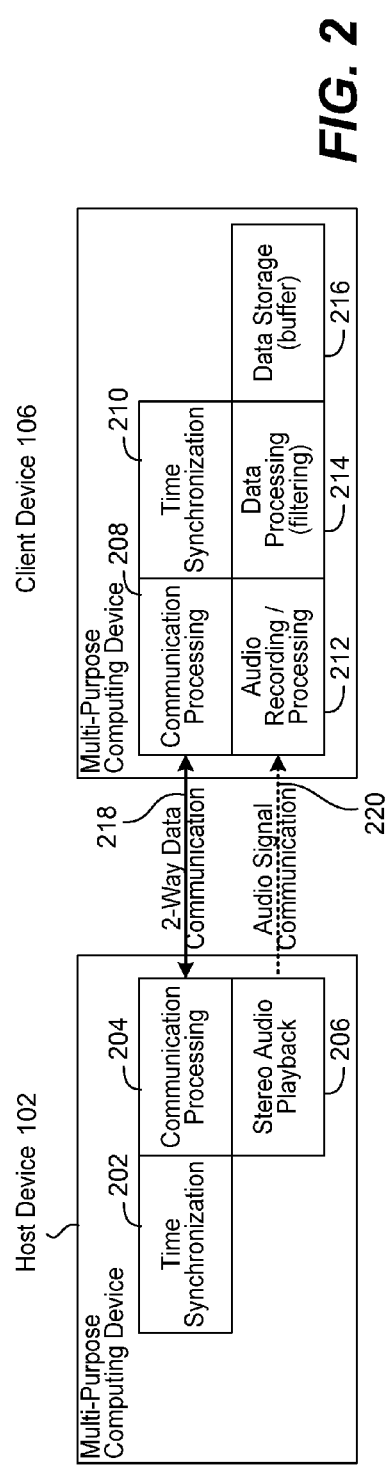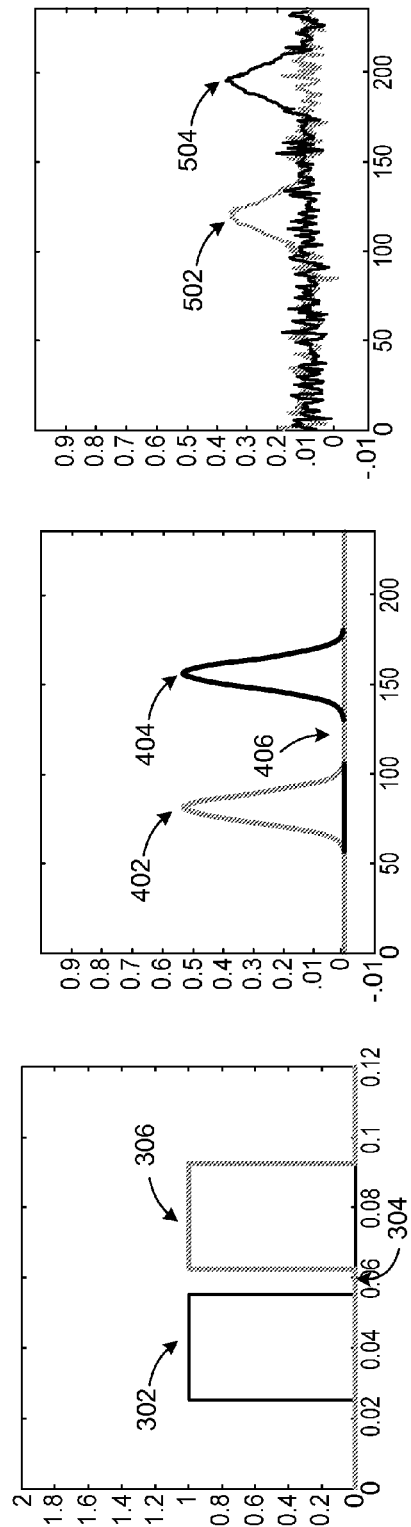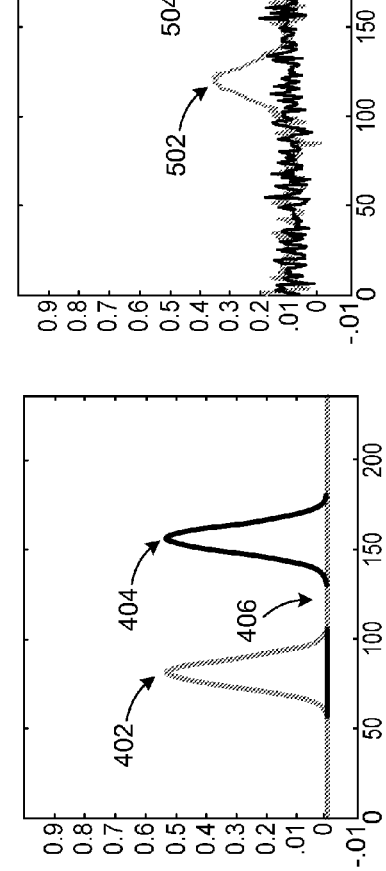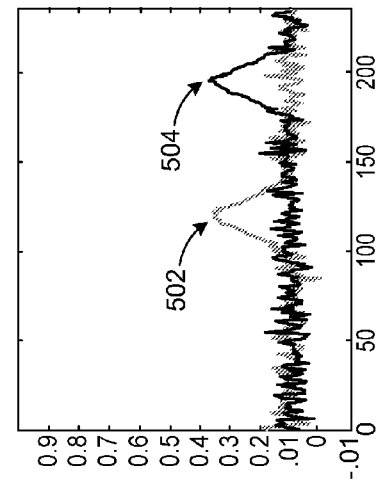

POSITION DETERMINATION OF DEVICES USING STEREO AUDIO

CROSS-REFERENCE TO RELATED APPLICATIONS

This application claims priority under 35 U.S.C. §119(e) to Provisional Patent Application No. 61/416,971, filed Nov. 24, 2010 entitled "Method and System for Determining User Intent and Orientation Information Using Electronic Devices," which is incorporated by reference herein in its entirety.

TECHNICAL FIELD

The present invention relates generally to computer software and audio signal processing. More specifically, it relates to systems using audio signals to determine position and location of devices.

BACKGROUND OF THE INVENTION

Traditionally, the television has been simply a portal for content streamed from another source (e.g., a network broadcaster or a cable company). The user generally did not have any interaction with the TV more than using the remote control. With recent advances in the diversity of content and platforms available for the television, the definition of "remote" or "input device" used to interact with TV has changed. The remote control is taking on a new role in the interaction between the user and TV. The utility of the remote control and the ways it can be utilized from knowing its position relative to the TV may now be important factors in differentiating remote controls and in their product valuation.

These changes to remote controls first came to gaming systems and the demand to replace the traditional "controller" device with something more intuitive and natural. This meant addressing device position determination. In the gaming industry, this trend has led to the Nintendo Wii, PlayStation Move and Microsoft Kinect. These systems are very intuitive for gaming, but require either specialized (expensive) accessory devices or have heavy processing requirements on the system. For example, Wii and PlayStation use optical tracking. Gaming systems often utilize wireless-signaling over power-line antenna for device synchronization. These synchronization methods rely on deterministic delays between devices. They also use IR emitter/detectors to translate signals optically between devices.

For lower power systems, specifically multimedia or application-based devices, these requirements are expensive and impracticable, and to some degree presently unattainable.

It would be desirable to make the handheld device, such as a smartphone, more versatile and useful. It would be desirable to enable position determination of a device by using existing sensors, such as a microphone and speakers, such as those found in TVs, photo frames, e-readers, and the like, and avoid complicated sensors.

SUMMARY OF THE INVENTION

In one aspect of the present invention, a method of transmitting audio signals and audio signal data from a host device to a client device is described. The host device receives a seeking event message from the client. Upon receiving the seeking event message, the host device emits an audio signal, in one embodiment, a stereo audio signal. The host device records the time that the audio signal was emitted, that is, played by the host device, such as a TV. The start time and other data are packaged into an audio event message which is transmitted to the client device.

Another aspect of the invention is a system for determining a distance between a host device, addressable on a network, and a client device, also addressable on the network. A client device has a client communication processing module, a client audio recording and processing module, a client time synchronization component. It also has a data processing component and data storage storing pre-determined, initial audio frequency data. The system also has a host device which has an audio playback component, a host time synchronization component, and a host communication process module. The system also has a two-way, non-deterministic data communication channel between the host device and the client.

In another aspect of the invention, a method of determining a position of a client device with respect to a host device is described. A client device receives audio signals from the host device. The client device receives an audio event message from the host device over a non-deterministic channel. Audio feature data is extracted from the audio signal. Peak events are identified in the audio feature data. The client device then measures offsets in the audio feature data using the peak events. A position of the client device with respect to the host device is calculated.

BRIEF DESCRIPTION OF THE DRAWINGS

The invention and the advantages thereof may best be understood by reference to the following description taken in conjunction with the accompanying drawings in which:

FIG. 2 is a block diagram showing components of a host device and a client device and connections between the two components in accordance with one embodiment;

FIG. 3 is a graphic representation of an audio file initially stored on a host device;

FIG. 4 is another graphic representation of an audio file stored on a host and client device;

FIG. 5 is a graphic representation of resultant data over a sequence shown in FIG. 4 having two peaks;

In the drawings, like reference numerals are sometimes used to designate like structural elements. It should also be appreciated that the depictions in the figures are diagrammatic and not to scale.

DETAILED DESCRIPTION OF THE INVENTION

Methods and systems for determining and utilizing spatial correlative information relating to two or more devices to determine device positioning are described in the various figures. Using audio signals emitted from stereo speakers associated with a first device and a microphone associated with the second device, methods and systems described here can be used to determine the distance and angle between the two devices, and as their relative positions. In one embodiment, no other sensors or specialized accessories are needed on either device to calculate the distance and angles. The devices need only be loaded with the appropriate software which, when executed, is able to carry out steps of various embodiments of the present invention. The usefulness of one or both of the devices may be enhanced by knowing the distance and angle data between the devices. For example, one device may be a TV having stereo speakers and the other device may be a handheld device, such as a smartphone, having a microphone. By enabling the handheld device to determine its distance from the TV, the utility of the handheld device may be more versatile and may be used to take greater advantage of the TV itself and of the TV platform, interfaces, content and the like. The systems and methods of the present invention enable a low-power solution to near proximity position determination between devices.

In one embodiment, one of the devices (Device A) has at least two stereo network addressable and separated speakers and another device, also network addressable (Device B) has at least one microphone. Device A and Device B are connected via a network to allow for data communication between them, the connection having a measurable distance (time) measurement. As described below, this connection is used to communicate messages between Device A and Device B. The connection may be wired or wireless and need not be linear, deterministic, or stable. In various embodiments, given that Device A sends a particular audio signal (sound) at a specific time and Device B receives the audio signal through a microphone, the distance and angle between the two devices can be determined. Their relative positions may also be determined.

Figure 1A:
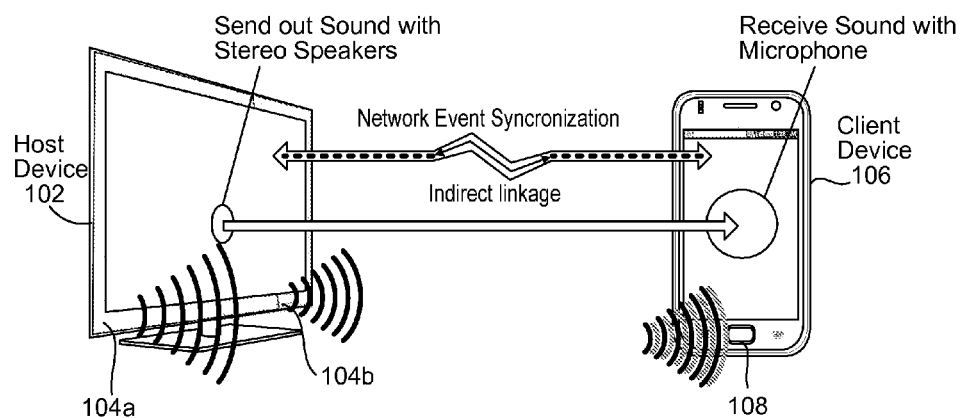
FIGS. 1A, 1B, and 1C are diagrams of a single input, multiple output (SIMO) correlative system having two or more output devices in accordance with various embodiments.
Figure 1B:
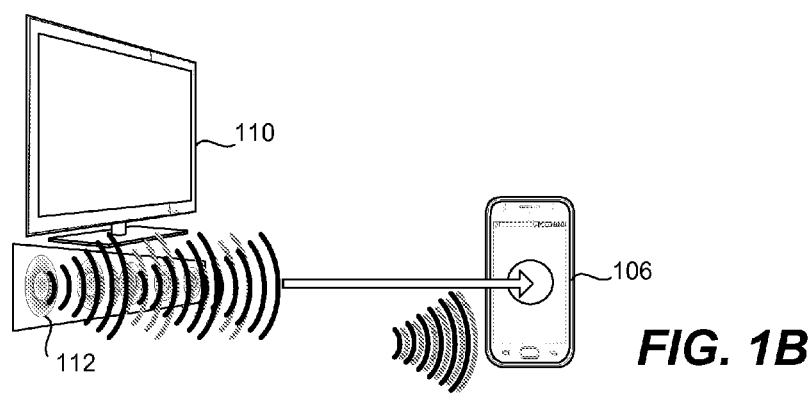

The systems described here may be characterized as single input (e.g., a microphone) and multiple output (e.g., stereo speakers), or SIMO correlative systems and are used to determine distance between devices. FIG. 1A is a diagram of a SIMO correlative system having two or more output devices. A host device 102, such as a computer monitor or a TV, emits binaural sound or audio signals via two stereo speakers, 104a and 104b attached to device 102. The speakers may be part of a sound bar (see FIG. 1B below) and are close to the device. A client device 106, such as a handheld device (e.g., a mobile phone), receives the audio signals at a microphone 108. Client device 106 is able to calculate the distance and angle of itself from host device 102 using the difference in the sounds it receives or "hears" from host device 102, certain correlation, also from host device 102, and stored audio frequency data (initial frequency data) on client device 106. FIG. 1 also shows a data connection 108 between host device 102 and client device 106 used to transmit messages (containing correlation data and network event synchronization data).

Figure 1C:
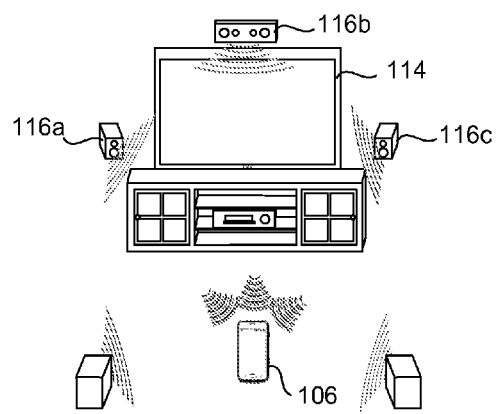

FIG. 1B is a diagram showing a host device 110 having a sound bar 112 where multiple speakers emit audio signals received by client device 106 having microphone 108. In this embodiment, the system described may be extended to multiple channels, where each channel has a specific frequency. In another embodiment, simply two of the multiple speakers in sound bar 112 would be used and the systems and methods described below (for two speakers) may be implemented. FIG. 1C is a diagram showing a surround sound configuration between a host device and a client device. Here host device 114, in this case a TV, has multiple speakers in front of and behind client device 106 (a configuration commonly referred to as surround sound). All speakers in the configuration emit audio signals. Client device 106 receives and processes audio signals from the three front (or forward-facing) speakers 116a, 116b, and 116c. Here stereo speakers are not fixed speakers and have an "associated" position. For example, a surround sound configuration utilizing speakers that have a known position, either manually assigned or calibrated with an external mechanism. As with the embodiments in FIGS. 1A and 1B, the embodiment in FIG. 1C would require the system to either be extended to multiple channels with a specific frequency for each channel or two of the multiple speakers may be used.

The data communication means 108 may utilize any mechanism that uses addressable network components and may be short or long range. Other systems use optical sensors or power-line antennas, and are generally deterministic communication methods. The data communication of the present invention between the host device and the client device uses more conventional, non-deterministic communication methods (e.g., TCP/IP). Thus, host and client devices may communicate via an Internet connection, Wi-Fi, a private network, a home network, and the like, and may be wired or wireless.

FIG. 2 is a block diagram showing components of host device 102 and client device 106 and connections between the two components in accordance with one embodiment. Although host device 102 has numerous components (some of which are described in FIGS. 10A and 10B), three are of particular relevance to the present invention. These and relevant components on client device 106 are briefly described here and their functionality in variance embodiments of the present invention are described in greater detail in FIGS. 7 and 8. Generally, host device 102 has certain requirements or characteristics. It is a multi-purpose, programmable computing device having at least one processor. It may also have or be connected to at least two addressable, fixed speakers or audio output devices that are position determinable. It may also have audio playback capabilities and a clock or other sequential timing device. It also has access to a communication channel for communicating with a client device (described below).

A time synchronization module 202 implements a high-resolution time or clock synchronization protocol, for example, the IEEE 1588 Precision Time Protocol. Many widely used consumer products, such as smartphones, also have time synchronization means. A communication processing module 204 accesses a communication sub-system (not shown) on the programmable platform of host device 102. For example, in a network environment this communication sub-system may be TCP or another networked communication system. It may also be a point-to-point system such as BLUETOOTH® wireless communication system or digital light communication protocol. A stereo audio playback component 206 accesses an audio playback sub-system on the programmable platform on host device 102.

Client device 106 has various components of particular relevance to the present invention. Two of these components are the same as those in host device 102, namely, a communication processing module 208 and a time synchronization module 210. These components perform the functions on client device 106 as they do on host device 102. Time synchronization module 210 and 202 implement the same time or clock synchronization protocol. The communication processing components communicate via a two-way data communication connection 218 which may be wired or wireless (the solid line 218 represents a means for communication between the two devices). As noted, this communication means may be TCP/IP-based, BLUETOOTH® wireless communication, Ethernet, or any other appropriate communication sub-system. The use of this communication channel is described below Client device 106 also has an audio recording/processing component 212. This component accesses the audio recording/data access sub-system on the programmable platform of device 106. A data processing component 214 implements data processing on device 106 for filtering and performing calculations on the data received over communication processing component 208 and audio recording/processing module 212. This data includes audio signal data and text data (e.g., correlation data, synchronization data). Audio signal communication is also performed between the devices, specifically, audio signals are emitted from speakers or audio output devices from host device 102 via stereo audio playback component 206 and received at audio recording/processing component 212 as shown by dashed line 220, which represents sound waves from host 102 to client 106.

FIG. 3 is a graphic representation of an audio file initially stored on host device 102. An audio file contains a sequence of impulses on separate channels as shown in FIG. 3. The impulses are divided into two groups (chains), also called audio "events," and each group is assigned specific frequencies (showing frequency response over a window). These frequencies are selected so that they do not conflict with each other, that is, they are non-harmonic frequencies. The frequencies are estimated to be in the range from 16 to 24 KHz depending on device capabilities, however, other ranges are possible, each having certain advantages and drawbacks. In FIG. 3 the x-axis represents time starting at time zero and ending at 0.12 seconds. The y-axis represents a normalized relative magnitude of the signal output. A first impulse is shown at 302 where the frequency begins playback of the first impulse chain for a specific amount of time. This is followed by a period of silence or near silence shown at 304 where the frequency drops to 0. A second impulse is shown at 306 where the frequency rises sharply to 1 and then falls to 0 after a specific amount of time. This is followed by a second impulse shown at 306. These impulse groups (302 and 306) may also be smoothed or otherwise filtered to reduce their audible signature as needed.

When frequency analysis of the audio sequence (an example of which is shown in FIG. 3) is performed for the specific frequencies over a chosen window size, a temporal representation of the resultant data over the sequence may look like the graph shown in FIG. 4. When the track shown in FIG. 4 is played over a stereo audio playback system 206 on host device 102, the device will emit two distinct sounds, one represented by 402 and another by 404, one from each speaker, with a specific delay 406 between sounds (audio "events"). The length of this delay between audio events is known to all devices in the network utilizing this system. In one embodiment, the delay may be 0 ms in which case the audio events would be simultaneous. The audio events are received by client device 106, specifically the microphone or audio recording/processing component 212. Client device 106 also has the track shown in FIG. 4 stored in its buffer. It is referred to as "initial frequency data and is pre-loaded onto all devices in the network utilizing the present invention. The same frequency analysis described above that took place on host device 102 is performed on the received audio data. The resultant data over the sequence may look like the graph shown in FIG. 5 having two peaks, 502 and 504. It should be noted that, for ease of illustration and explanation, this example shows the case of a "stereo" speaker system. However, two or more channels may be used, each with individual audio "events" on each channel, each channel having a fixed frequency. The delays and graphs of such audio events would be similar to those shown in the figures herein.

Figure 6:
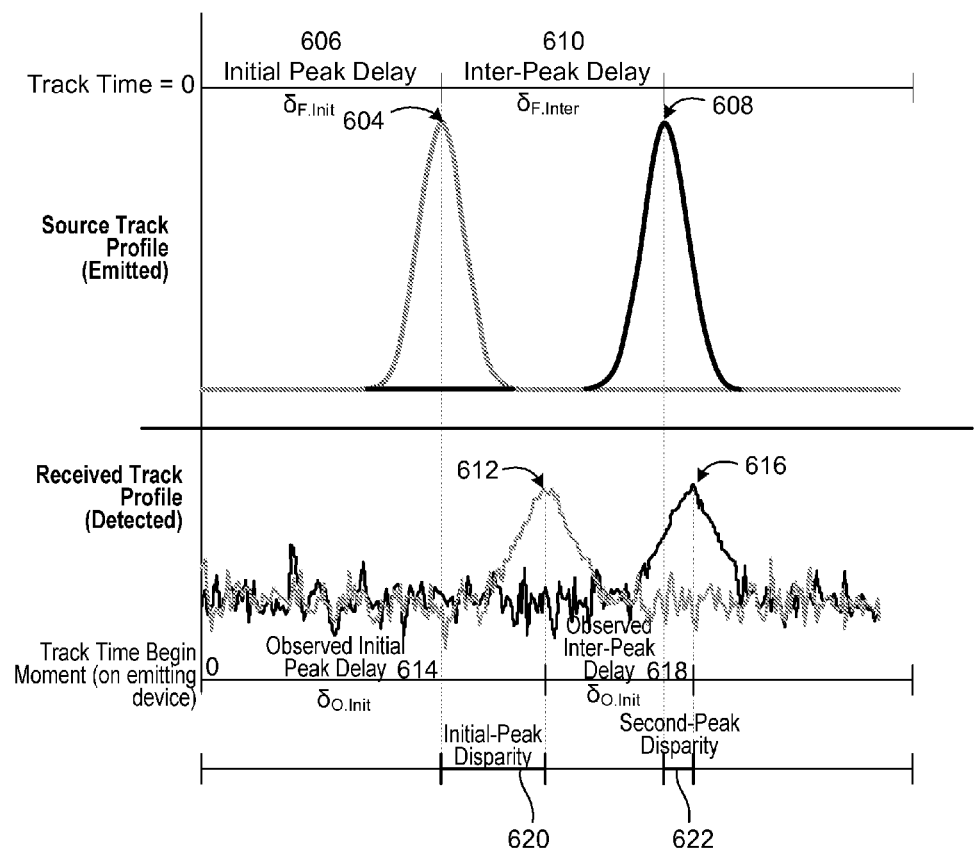
FIG. 6 are graphic representations showing how extracted frequency tracks can be analyzed to determine the delay in receiving the audio from each speaker on a host device in accordance with one embodiment of the present invention.

FIG. 6 shows how extracted frequency tracks can be analyzed to determine the delay in receiving the audio from each speaker on host device 102 in accordance with one embodiment of the present invention. It shows an audio source and receiver correlation comparison. The graph shown in FIG. 4 is displayed above the graph shown in FIG. 5, where the y-axis (left-most vertical line) 602 indicates a moment in time when the track was emitted from the host device (i.e., the emitting device). The graph on top (FIG. 4) may be referred to as a source track profile (emitted) and the graph on the bottom (FIG. 5) may be referred to as a received track profile (detected). The source track profile is stored on each client device and is used for the analysis and comparison described below.

With respect to the source track profile, the time between 0 and an initial peak 604 is referred to as initial peak delay 606. In this example, time is measured in microseconds. The time between an initial peak 604 and a second peak 608 is referred to as an inter peak delay 610.

With respect to the received track profile (on client device 106, that is, the track profile representing what the client device "heard"), the time between 0 and an observed initial peak 612 is referred to as an observed initial peak delay 614. The time between observed initial peak 612 and an observed second peak 616 is referred to as an observed inter-peak delay 618.

From these delay values, two specific disparity (or difference) values may be calculated. One is an initial peak disparity 620 (shown on the line at the bottom of FIG. 6) which is the difference in time between observed initial peak 612 and initial peak 604. Or, it may be described as the difference between observed initial peak delay 614 and initial peak delay 606. Similarly, a second peak disparity 622 is calculated by taking the difference in time between observed second peak 616 and second peak 608. Or, it may be derived from first taking the sum ("sum A") of observed initial peak delay 614 and observed inter-peak delay 618. This is followed by taking the sum ("sum B") of initial peak delay 606 and inter-peak delay 610. Sum B is subtracted from Sum A to arrive at second-peak disparity 622.

With regard to FIG. 6, the initial starting time of the audio track is determined by utilizing the time contained in an "audio event" message from host device 102 and time synchronization regarding the difference between the clocks on host and client devices. The initial audio frequency data (stored on the client device) is compared to the received audio frequency data (what the client device actually "heard") by producing a disparity value for each signal. As shown above, this disparity is calculated for both the first and second peaks in the signal in the example above. When extended to more than more than two emitters, the measurements may be for values between the first peak and each subsequent peak.

Figure 7:
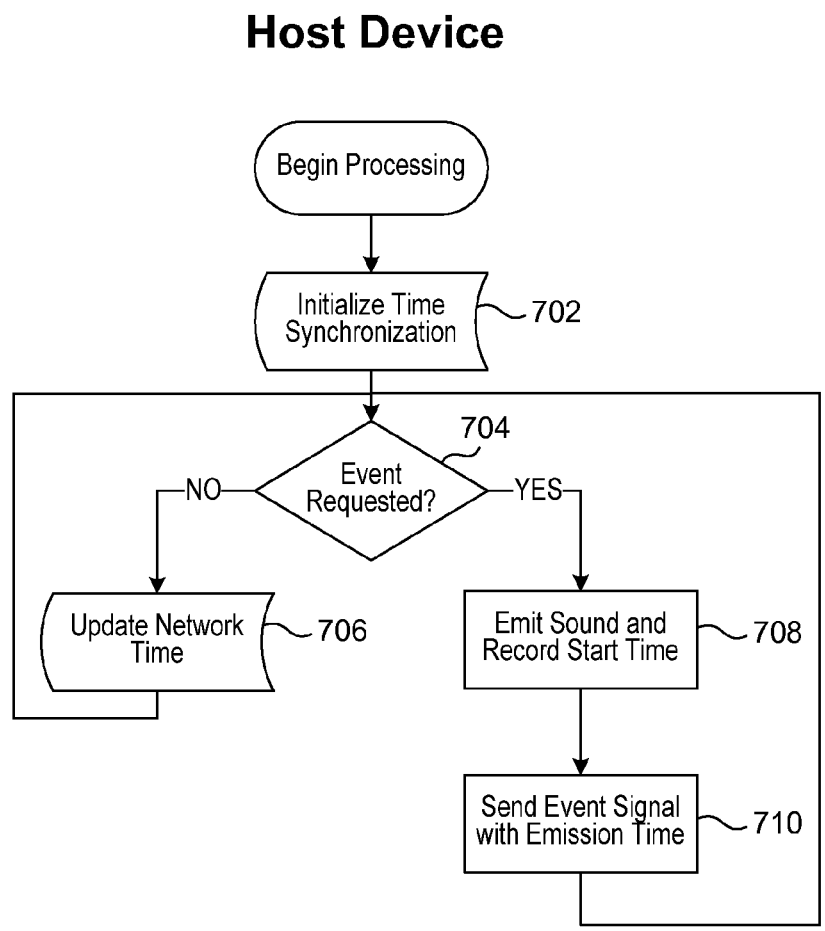
FIG. 7 is a flow diagram of processes occurring on the host device in accordance with one embodiment of the present invention.

FIG. 7 is a flow diagram of processes occurring on the host device in accordance with one embodiment of the present invention. Steps of the methods shown and described need not be performed (and in some implementations are not performed) in the order indicated. Some implementations of these methods may include more or fewer steps than those described. At step 702 the host device, such as a TV, after powering on or starting up, performs an initial time synchronization with other compatible client devices over a deterministic communication channel or means, as described above with respect to channel 218, in order to correlate clocks on the host device and on one or more client devices. The process then loops, synchronizing the time across compatible client devices.

At step 704 the device checks whether an event request has been requested by a client device. This is a request to initiate a "seeking" event. The host device waits for a seeking event request over the communication channel. The event request is essentially a network message from a client device requesting the host device to emit or playback appropriate sounds so that the distance between the two devices may be determined. If a seeking event message is not received (which is likely to be a vast majority of the time), control goes to step 706 where the device updates the network time and time synchronization across compatible client devices, after which the host device returns to waiting for a seeking event request.

If an event message is received by the host device, control goes to step 708 where the device emits (plays) specific sounds from its speakers or other audio output components utilizing the device's audio playback system (component 206 in FIG. 2). The exact time (or date/time) that the audio signal is played is recorded and stored by the host device. Once the sounds are emitted (the sounds consisting of, for example, two audio events if two speakers are used) and the start time is recorded, control goes to step 710.

At step 710 an event signal message is created by the host device containing a time synchronized timestamp of when the audio signal was emitted. This is then broadcasted as an "audio event" message to any compatible client device, which includes, at a minimum, the client device that requested the event, over a deterministic communication channel. In most cases this will be the same communication channel (channel 220) from which the host device received the event request from the client device. The process then returns to step 704 where the host device waits for another seeking event request. It is helpful to note that the host device may receive event requests from a number of different types of client devices.

Figure 8:
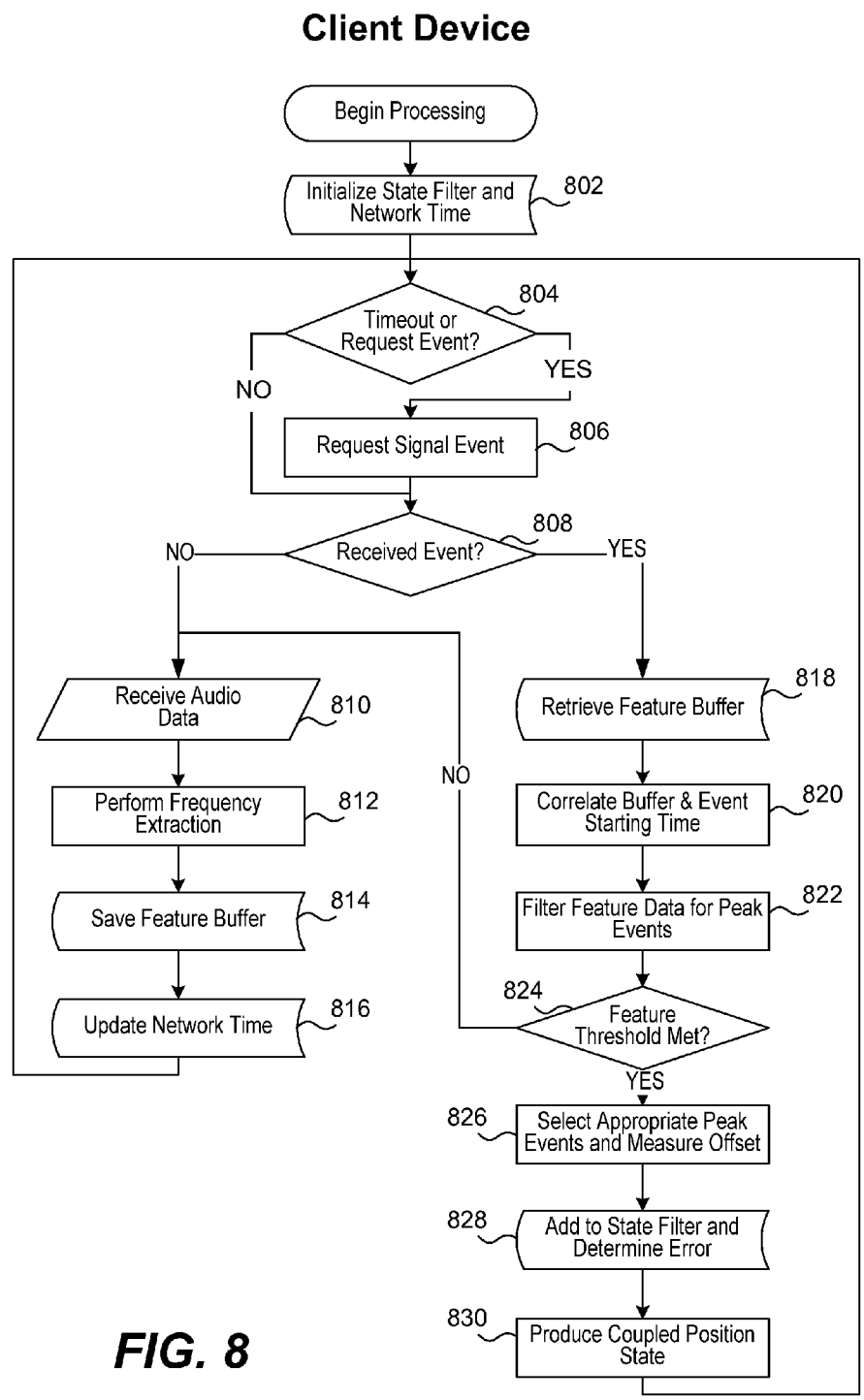
FIG. 8 is a flow diagram of processes executing on a client device in accordance with one embodiment of the present invention.

FIG. 8 is a flow diagram of processes executing on a client device in accordance with one embodiment of the present invention. Steps of the methods shown and described need not be performed (and in some implementations are not performed) in the order indicated. Some implementations of these methods may include more or fewer steps than those described. At step 802 the client device, such as a smartphone or a tablet computer, after starting up, performs an initial time synchronization (network time and other variables) with any compatible host devices over the communication channel. It also initializes its data storage component, specifically, the device state. It then loops through a process on delay or request to broadcast a request for a seeking event to any compatible host devices over the communication channel.

At step 804 the client device either encounters a timeout or requests an event from a host device. If there is a timeout (a specific time has passed and no audio event has been received) or an event request control goes to step 806 where the client device requests a seeking event. This may be done by the user upon initializing an app on the client or it may be initiated using other autonomous means, such as via UPnP. Control then goes to step 808 where the device waits for an audio event. If at step 804 a timeout or request event does not occur, control goes straight to step 808 (the device bypasses a request for seeking event).

At step 808 the client device waits for an "audio event" message from the host device. As noted above, this message contains a timestamp of when an audio signal was played from the host device and network synchronization data (correlation data). If it does not receive such an event signal, control goes to step 810 where the client device waits to receive audio events from a host device. That is, the audio recording/processing component 212, such as a microphone, on the client device receives or "hears" audio data, as shown in FIG. 5. The device, specifically data processing component 214, with input from time synchronization module 210, analyzes the audio data and performs frequency extraction at step 812. At step 814 the extracted features from the audio data is stored or saved in data storage (buffer) 216. At step 816 the client device updates the network time (performs time synchronization) across compatible host devices, after which control returns to step 804 where the device waits for a timeout or an audio event signal.

At step 808, the client waits for an audio event message. If it receives one, control goes to step 818 where the features (derived from frequency extraction at step 812) of the audio data are retrieved from the buffer. At step 820 the client device correlates, or measures the alignment of, the features retrieved from the buffer with the emission start time contained in audio event message. This is the time that the host device emitted the sound from its speakers. At step 822 the feature data is filtered to determine the peak events in the data. For example, it may identify peaks 612 and 616, as shown in FIG. 6. There may be more than two peaks in the feature data. At step 824, the client determines whether the feature data has met a feature threshold level. That is, it determines whether the client device could sufficiently hear the audio signals sent by the host. If it could not (the feature threshold was not met), then control goes to step 810 where the client waits to receive audio data. If it does, then control goes to step 826.

At step 826, the data processing component 214 selects the appropriate peak events and begins to measure offsets. For example, the appropriate peak events may be peaks 612 and 616. Several processing steps occur at step 826. Referring to FIG. 6, the initial start time of the audio signal is determined using the time contained in the audio event message from the host device and the time synchronization information regarding the difference between the clocks on the host and client devices.

In one embodiment, each client device is provided with initial audio frequency data of the two sounds emitted by the host device(s). These sounds remain the same and the client devices are pre-loaded with their frequency data. This initial audio frequency data, shown as the top graph having peaks 604 and 608 in FIG. 6, is compared to the audio signals received by the client device (see step 810). The received or detected audio signals are shown in the bottom graph having peaks 612 and 616 of FIG. 6. From this comparison and as described in FIG. 6, in one embodiment, two delays are determined and two disparities are calculated for each signal. An observed initial peak delay 614 is retrieved. An initial peak delay 606 (from the pre-stored initial frequency data) is retrieved and the disparity (difference) between values 614 and 606 is referred to as initial-peak disparity 620. Calculations for second-peak disparity 622 may be calculated first by taking the sum of observed initial peak delay and the observed inter-peak delay. The initial-peak delay is added to the inter-peak delay. This sum is subtracted from the first sum to arrive at the second-peak disparity 622. If the host device were extended to have more than two speakers or audio output components, offset measurements may be performed between the first peak (e.g., peak 604) and each subsequent peak.

There are a few notable points relating to the calculations above. Each delay in the initial (emitted) audio frequency (e.g., delays 606 and 610) has some level of noise, however, there is generally less noise in the inter-peak delay 610. This is an important distinguishing feature because measurement of the position of a client device can be abstracted into two different components. First, the calculated audible delay between the host and client devices, which is used in calculating the distance between the two devices and represented by the initial peak delay. Second, the calculated differential in position of the two impulses between the source and received track profiles, which is used in calculating the angular offset between the timing synchronization between the devices is completely encapsulated in the initial-peak delay and while this can produce noisy distance measurements, the inter-peak delay provides stable angular offset values between the devices. This separation provides different error estimates for these different components of the position calculation. For some embodiments of this invention, only the angular component is explicitly important.

In measuring the first peak as an "absolute" time difference and inter-peak delays as separable, it is possible to better control error in this non-deterministic environment. This is due to the expected latency variance from being significantly segregated to a single source (i.e., host device) and only effecting time-of-flight (TOF) effects, therefore affecting only distance characteristics and not the differential angular characteristics of the received audio signals.

Figure 9:
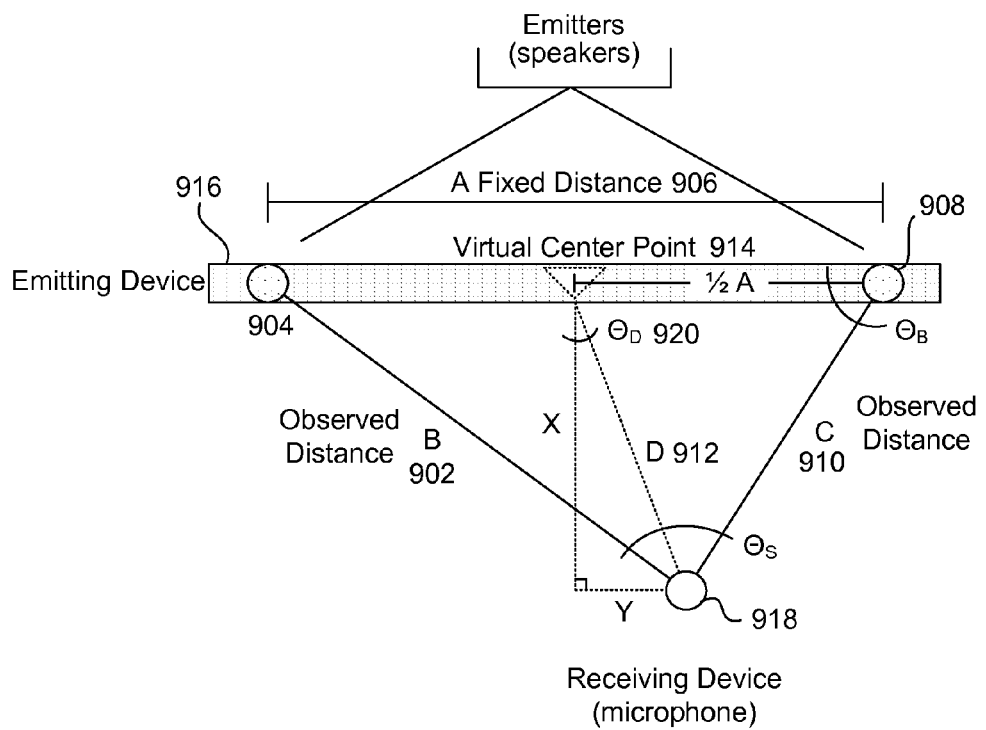
FIG. 9 is a schematic diagram showing angles and distances between host and client devices.

FIG. 9 is a schematic diagram showing angles and distances between host and client devices. Measuring distance and angular characteristics separately, but using the same data requires some assumption and relative adjustment of parameters. Because the "angle" between the two devices is going to be relative to the ratio of difference between the TOF of the first and second channels, the angle can be estimated assuming that the host and client devices are within absolute near proximity; or assuming that one distance is fixed. Referring now to FIG. 9, giving measurement B 902 (assuming B represents the observed distance of a first emitting speaker 904) a distance of half of A (½A, where A 906 is a fixed distance between the first and second speaker 908) and allows the measurement of B to be influenced by this assumption and measured accordingly. This measurement only requires knowing inter-peak delay 610 and will produce an accurate relative distance between speakers A and B for angle measurements within a "normal" sized room in which a system like this would be used. In addition, it may either cover wider spaces or additional distance. Using hysteresis on distances will allow for a progressive prior to be used as a dynamically "fixed" distance for this calculation which will increase accuracy for larger distances.

Returning to FIG. 8, once the calculations for measuring the offsets are complete at step 826, control goes to step 828 where the measurements and values are stored in the buffer and added to a state filter, representing the current calculation of position values for the client device with respect to the host device. Here, hysteresis or other filtering is used to account for errors on the actual measurements because they are non-deterministic.

At step 830 the position of the client device relative to the host device is calculated, referred to as a coupled position state. Referring to FIG. 9, first, observed distances B and C 910 are calculated. This is done using the initial-peak and second-peak disparities and the speed of sound, $c_{air}$.

$$c_{air} \sim 0.000343333333_{m/\mu s}$$

$$B_{(m)} = c_{air(m/\mu s)} / \Delta_{Init}$$

$$C_{(m)} = c_{air(m/\mu s)} / \Delta_{Second}$$

Next, the distance D 912 of the client (receiving) device 918 relative to the virtual center point 914 of the host device 916 is determined. This is done using distances A (fixed), B, and C as shown in FIG. 9.

Thus, the present invention utilizes a Known Output Model, namely triangulation, for audio signals emitted from stereo speakers and being received by a handheld or mobile device. It also uses a separated frequency per channel model for stereo speakers being differentiable by a single receiving device.

Using trigonometric Identities describing triangulation, the Measure D can be calculated as follows using measured values A, B and C. The value for A, the space between the emitting speakers, can be hard-coded in the host device and communicated to the client in the audio event message or can be calculated using an external process.

$$D = \sqrt{\frac{B^2 + C^2}{2} - \frac{A^2}{4}}$$

And given the measured values for A, B, C and D, the Angle $\Theta_D$ 920 can be calculated as follows.

$$\theta_D = 90° - \cos^{-1}\left(\frac{A}{4D} + \frac{D}{A} - \frac{C^2}{AD}\right)$$

The x and y coordinates (offsets) of client (receiving) device 918 relative to virtual center point (0,0) 914 (of host device 919) calculated as below:

$$X = D \cos(\Theta_D)$$

$$Y = D \sin(\Theta_D)$$

The process then returns to step 804 where a timeout occurs or the client receives a seeking event.

With current TV technology the present invention leverages the use of platforms on handheld devices, such as smartphones, so that the processing is distributed between the handheld device and the TV. In this respect, the smartphone functions as an accessory device (user identification) and distributes the processing load. The invention utilizes the handheld device to improve the device/application/media experience with the user of an interface. Thus, in the manner described above, the present invention uses a non-deterministic, device-addressable network and delays (e.g., Ethernet) to synchronize a SIMO correlative system to determine positions of devices. It enables the use of multiple addressable network connections to allow multiple devices to simultaneously interact with a host device when deterministic links (e.g., optical, power-line antenna) are unavailable.

Figure 10A:
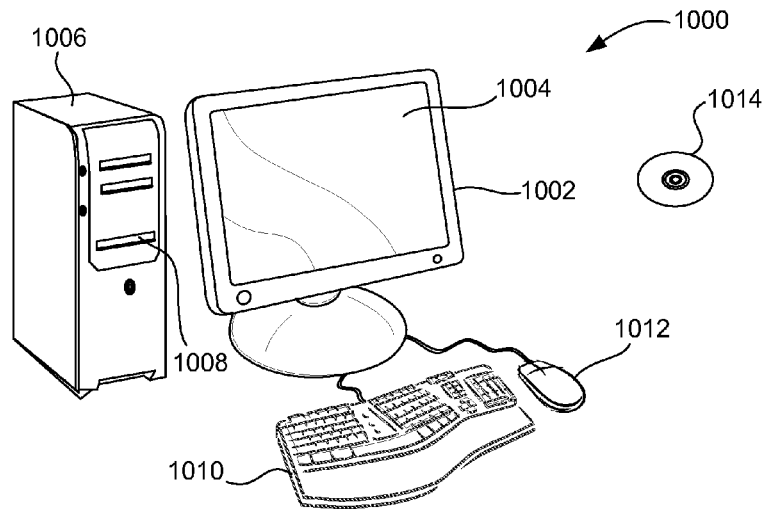
FIGS. 10A and 10B show physical implementations of a multi-purpose computing device.
Figure 10B:
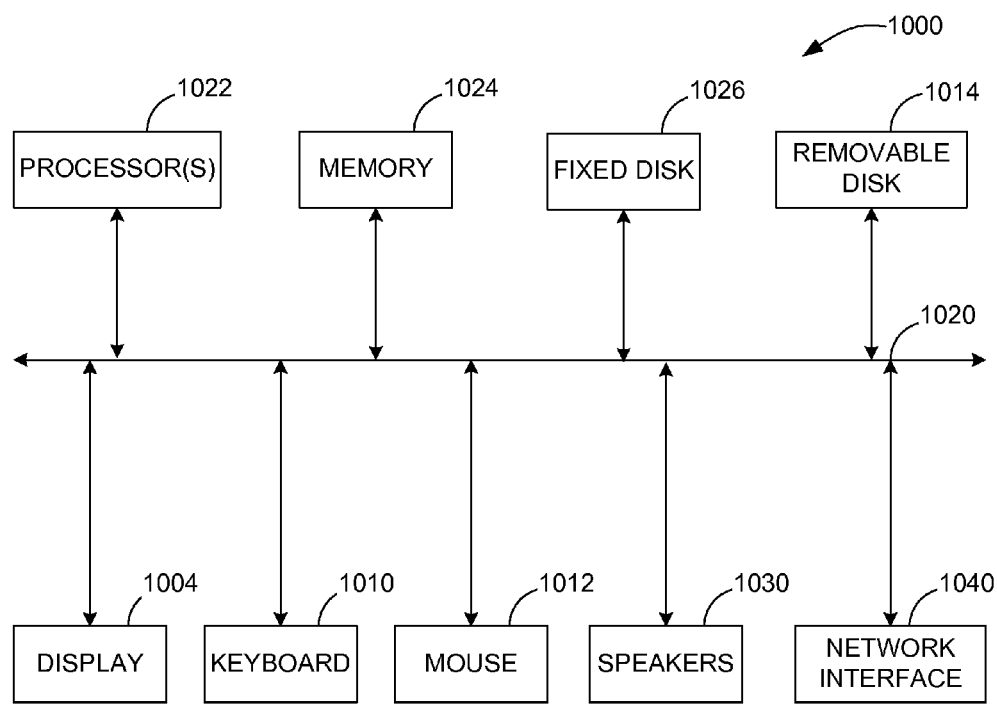

As noted above, there are various types of multi-purpose computing devices and systems utilized in the in the present invention, including but not limited to TVs, computers, and mobile devices (such as cell phones, tablets, media players, and the like). FIGS. 10A and 10B illustrate a computing device 1000 suitable for implementing specific embodiments of the present invention, including host device 102 and client device 106. FIG. 10A shows one possible physical implementation of a computing system. In one embodiment, system 1000 includes a display 1004. It may also have a keyboard 1010 that is shown on display 1004 or may be a physical component that is part of the device housing. It may have various ports such as HDMI, DVI, or USB ports (not shown).

Computer-readable media that may be coupled to device 1000 may include USB memory devices and various types of memory chips, sticks, and cards.

FIG. 10B is an example of a block diagram for computing system 1000. Attached to system bus 1020 is a variety of subsystems. Processor(s) 1022 are coupled to storage devices including memory 1024. Memory 1024 may include random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1026 is also coupled bi-directionally to processor 1022; it provides additional data storage capacity and may also include any of the computer-readable media described below. Fixed disk 1026 may be used to store programs, data and the like and is typically a secondary storage medium that is slower than primary storage. It will be appreciated that the information retained within fixed disk 1026, may, in appropriate cases, be incorporated in standard fashion as virtual memory in memory 1024.

Processor 1022 is also coupled to a variety of input/output devices such as display 1004 and network interface 1040. In general, an input/output device may be any of: video displays, keyboards, microphones, touch-sensitive displays, tablets, styluses, voice or handwriting recognizers, biometrics readers, or other devices. Processor 1022 optionally may be coupled to another computer or telecommunications network using network interface 1040. With such a network interface, it is contemplated that the CPU might receive information from the network, or might output information to the network in the course of performing the above-described method steps. Furthermore, method embodiments of the present invention may execute solely upon processor 1022 or may execute over a network such as the Internet in conjunction with a remote processor that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What we claim is:

1. A method of determining a position of a client device, the method comprising:
   receiving, via a microphone of the client device, audible audio signals, wherein the audible audio signals comprise host emitted stereo sounds;
   receiving an audio event message over a non-deterministic channel;
   extracting audio feature data from the audible audio signals;
   identifying peak events in the audio feature data;
   retrieving stored initial frequency information from an audio file, the initial frequency information comprising impulse frequency information for one or more assigned audio non-harmonic frequencies for the audible audio signals, from the client device;
   measuring offsets in the audio feature data using the peak events and the initial frequency information; and
   calculating a position of the client device based on the audible audio signals.

2. The method of claim 1, further comprising:
   comparing particular initial audio frequency information with frequency data of the received audio feature data; and
   performing a frequency analysis on the received audible audio signals.

3. The method of claim 1, wherein identifying peak events further comprises:
   determining an emitted initial peak delay; and
   determining an observed initial peak delay.

4. The method of claim 3, further comprising:
   determining an emitted inter-peak delay; and
   determining an observed inter-peak delay.

5. The method of claim 3, wherein measuring offsets further comprises:
   calculating an initial peak disparity by subtracting the emitted initial peak delay from the observed initial peak delay.

6. The method of claim 4, wherein measuring offsets further comprises:
   calculating a second peak disparity by adding the observed initial peak delay and the observed inter-peak delay to arrive at a first sum and adding the emitted initial peak delay and the emitted inter-peak delay to arrive at a second sum; and
   subtracting the second sum from the first sum.

7. The method of claim 1, further comprising:
   determining a start time of the audible audio signals by examining the audio event message.

8. The method of claim 1, further comprising:
   obtaining a first distance value of a distance between a first audio speaker and a second audio speaker.

9. The method of claim 8, further comprising:
   calculating a second distance value, the second distance value being the distance between the first audio speaker and the client device, said calculating performed using speed of sound and the initial peak disparity.

10. The method of claim 9, further comprising:
    calculating a third distance value, the third distance value being the distance between the second audio speaker and the client device, said calculating performed using the speed of sound and the second peak disparity.

11. The method of claim 10, further comprising:
    using the first distance value, the second distance value, and the third distance value to calculate a fourth distance value between the client device and a virtual center point.

12. The method of claim 1, further comprising:
calculating an angle between a median line and a derived Euclidian distance line connecting the client device and a virtual center point.

13. The method of claim 1, further comprising:
performing initial time synchronization.

14. The method of claim 1, wherein a start time of emission of the audible audio signals is recorded.

15. The method of claim 14, wherein the client device receives the audio event message which contains the start time of emission of the audible audio signals.

16. The method of claim 10, wherein the fourth distance value is a derived Euclidian distance between the client device and a virtual center point.

17. The method of claim 1, further comprising: transmitting a seeking event message from the client device.

18. The method of claim 1, wherein calculating a position of the client device further comprises:
performing triangulation calculations.

19. The method of claim 1, wherein measuring offsets further comprises: determining whether feature thresholds are met.

20. The method of claim 1, wherein the audible audio signals includes two signals.

21. The method of claim 1, further comprising:
retrieving audio feature data from a buffer on the client device.

22. The method of claim 1, further comprising: filtering the audio feature data for obtaining peak events.

23. The method of claim 1, wherein the client device is an addressable network component.

24. The method of claim 1, wherein a calculated audible delay is used for determining distance of the client device, and a calculated differential in position of impulses between a source track profile and a received track profile is used for calculating angular offset values.

25. A client device addressable on a network, the client device comprising:
a communication processing component;
an audio recording and processing component;
a time synchronization component;
a data processing component; and
data storage configured to store pre-determined initial audio frequency information in an audio file, the initial audio frequency information comprising audio file sound track frequency information for one or more assigned audio non-harmonic frequencies for received audible audio signals, and audible audio signals comprise host emitted stereo sounds;
wherein the client device determines distance based on a disparity between the received audible audio signals and the pre-determined initial audio frequency information, and the audible audio signals are received via a microphone of the audio recording and processing component.

26. The client device of claim 25, wherein the client device is a mobile phone.

27. The client device of claim 25, wherein the time synchronization component implements a clock synchronization protocol.

28. The client device of claim 25, wherein the data processing component filters and performs calculation on audio data received from the communication processing component.

29. The client device of claim 25, wherein the pre-determined initial audio frequency information on the client device represents a received standard audio signal to determine the distance for the client device.

30. A method of distance determination based on audio signals and audio signal data, the method comprising:
receiving, by a host device, a client seeking event message;
emitting audible audio signals via a first audio speaker and a second audio speaker on the host device based on the received client seeking event message;
recording a start time of the audible audio signals emission by the host device;
transmitting from the host device an audio event message containing the start time;
storing, by the host device, initial frequency information in an audio file, the initial frequency information comprising impulse frequency information for one or more assigned audio non-harmonic frequencies for the emitted audible audio signals; and
causing distance determination based on a disparity between the audible audio signals and the pre-determined initial frequency information.

31. The method of claim 30, wherein sequence of impulses includes two distinct sounds, a first sound followed by a second sound, the first sound emitted from the first audio speaker and the second sound emitted from the second audio speaker.

32. The method of claim 30, further comprising: determining whether the client seeking event message was received.

33. The method of claim 30, wherein the audio event message contains network synchronization data.

* * * * *